US008984019B2

(12) United States Patent
Duan et al.

(10) Patent No.: US 8,984,019 B2
(45) Date of Patent: Mar. 17, 2015

(54) SCALABLE SUMMARIZATION OF DATA GRAPHS

(71) Applicant: International Business Machines Corporation, Armonk, NY (US)

(72) Inventors: Songyun Duan, Pleseantville, NY (US); Achille Belly Fokoue-Nkoutche, White Plains, NY (US); Anastasios Kementsietsidis, New York, NY (US); Wangchao Le, Salt Lake City, UT (US); Feifei Li, Salt Lake City, UT (US); Kavitha Srinivas, Rye, NY (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 13/682,245

(22) Filed: Nov. 20, 2012

(65) Prior Publication Data

US 2014/0143280 A1    May 22, 2014

(51) Int. Cl.
*G06F 17/30*    (2006.01)

(52) U.S. Cl.
CPC ................. *G06F 17/30292* (2013.01)
USPC ........................................................ 707/798

(58) Field of Classification Search
CPC .......... G06Q 10/06; G06Q 10/063112; G06Q 10/107; G06Q 10/063118; G06Q 10/06313; G06Q 10/06316; G06Q 10/0633; G06Q 10/04; G06Q 10/047; G06Q 10/063114; G06Q 10/063116; G06Q 10/1091; G06F 17/2745
USPC ...................... 707/E17.09, E17.094, 999.002, 707/999.003, 999.1, E17.012, E17.014, 707/E17.017, 713, 723, 769, 803, E17.001, 707/E17.005, E17.032, E17.044, E17.046, 707/E17.108, 707, 737, 754, 755, 759, 792, 707/797, 798, 800, 802, 808, 811, 999.001, 707/999.004, 999.005, 999.101, 999.102; 715/853, 854, 763, 210, 229, 234, 255, 715/256, 760; 705/7.14, 7.17, 7.23, 32, 705/7.15, 7.16, 7.26, 7.27; 709/206, 201, 709/223, 224

See application file for complete search history.

(56) References Cited

U.S. PATENT DOCUMENTS

| 6,334,125 B1 * | 12/2001 | Johnson et al. ............... 707/713 |
| 6,556,983 B1 | 4/2003 | Altschuler et al. |
| 8,739,016 B1 * | 5/2014 | Goldman et al. ............. 715/200 |
| 2006/0271304 A1 | 11/2006 | He et al. |

(Continued)

OTHER PUBLICATIONS

T. Tran et al. (Top-K exploration of query candidate for efficient keyword search on graph-shaped (RDF) data, ICDE 2009; p. 408-416).*

(Continued)

*Primary Examiner* — Jay Morrison
*Assistant Examiner* — Ken Hoang
(74) *Attorney, Agent, or Firm* — August Law, LLC; George Willinghan

(57) ABSTRACT

Keyword searching is used to explore and search large Resource Description Framework datasets having unknown or constantly changing structures. A succinct and effective summarization is built from the underlying resource description framework data. Given a keyword query, the summarization lends significant pruning powers to exploratory keyword searches and leads to much better efficiency compared to previous work. The summarization returns exact results and can be updated incrementally and efficiently.

17 Claims, 5 Drawing Sheets

(56) References Cited

U.S. PATENT DOCUMENTS

| | | | |
|---|---|---|---|
| 2009/0240682 A1 | 9/2009 | Balmin et al. | |
| 2010/0161680 A1 | 6/2010 | Atre et al. | |
| 2010/0306278 A1* | 12/2010 | Oliver et al. | 707/803 |
| 2011/0169819 A1 | 7/2011 | Ian | |
| 2011/0191328 A1 | 8/2011 | Vernon et al. | |
| 2012/0310916 A1* | 12/2012 | Abadi et al. | 707/713 |

OTHER PUBLICATIONS

Koloniara et al., "Peer-to-Peer Management of XML Data: Issues and Research Challenges" SIGMOD Record, vol. 34, No. 2, Jun. 2005.

B. B. Dalvi et al., "Keyword search on external memory data graphs", in VLDB, 2008.

Chen et al., "D(K)-Index: An Adaptive Structural Summary for Graph-Structured Data" SIGMOD 2003, Jun. 9-12, 2003, San Diego, CA.

H. Fu and K. Anyanwu, "Effectively interpreting keyword queries on rdf databases with a rear view", in ISWC, 2011.

H. He et al., "Blinks: ranked keyword searches on graphs", In SIGMOD, 2007.

Huang et al., "Scalable SPARQL Querying of Large RDF Graphs," The 37th International Conference on Very Large Data Bases, Aug. 29 Sep. 3, 2011, Seattle, Washington.

Li et al, "EASE: An Effective 3-in-1 Keyword Search Method for Unstructured, Semi-structured and Structured Data", SIGMOD'08, Jun. 9-12, 2008, Vancouver, BC, Canada.

M. Kargar and A. An, "Keyword search in graphs: Finding r-cliques", in VLDB, 2011.

Polyzotis et al., "Structure and Value Synopses for XML Data Graphs," Proceedings of the 28th VLDB Conference, Hong Kong, China, 2002.

T. Tran et al, "Top-k exploration of query candidates for efficient keyword search on graph-shaped (RDF) data", ICDE 2009.

* cited by examiner

S: SpaceMission  B:Building  R:Rocket  P:Person h: partition  h_t: tree  s:summary

SCALABLE SUMMARIZATION OF DATA GRAPHS

FIELD OF THE INVENTION

The present invention relates to data storage and data queries.

BACKGROUND OF THE INVENTION

Resource Description Framework (RDF) is the de-facto standard for data representation on the World Wide Web. The amount of RDF data from disparate domains grows rapidly. For instance, the Linked Open Data (LOD) initiative integrates billions of entities from hundreds of sources. Just one of these sources, the DBpcdia dataset, describes more than 3.64 million things using more than 1 billion RDF triples, of which 385 million are extracted from the English edition of Wikipedia.

Keyword searching is used to explore and search large data corpuses whose structure is either unknown or constantly changing and has already been studied in the context of World Wide Web data, graphs, relational databases and XML documents. More recent efforts considered applying keyword searching over RDF data; however, the solutions considered by these efforts have serious limitations. Most notably, these previous attempts suffer from either false positives, i.e., the keyword search returns answers that do not correspond to real subgraphs from the underlying RDF data or false negatives, i.e., the search misses valid matches from the RDF data. A severe limitation of existing techniques is the inability to scale to handle typical RDF datasets with tens of millions of triples. When presented with such workloads, existing techniques often return empty results for meaningful keyword queries that do have matches from the underlying RDF data.

SUMMARY OF THE INVENTION

Exemplary embodiments of systems and methods in accordance with the present invention provide improved keyword searching over large volumes of resource description framework (RDF) data. A scalable and exact solution handles realistic RDF datasets with tens of millions of distinct triples and achieves accurate search results. A succinct and effective summarization structure is built from the underlying RDF graph based on the type system in the RDF graph. Given a keyword search query, the summarization structure prunes out the keyword search space, which leads to increased efficiency compared to approaches that process queries directly on the RDF graph. This summarization is accomplished without any loss of information or data contained in the underlying RDF graph dataset.

A critical error in the termination condition of existing keyword search techniques misses correct results even if this error is fixed due to the limitations in its summarization. The present invention provides a correct termination. Efficient algorithms summarize the structure of RDF data into a summarization that is indexable, lightweight, and easy to update. In addition, the summarization is scalable and gives exact results. Keyword search queries are answered based on the summarization. In addition, the summarization can be updated incrementally and efficiently, with insertions or deletions to the underlying RDF data.

DETAILED DESCRIPTION

Figure 1:
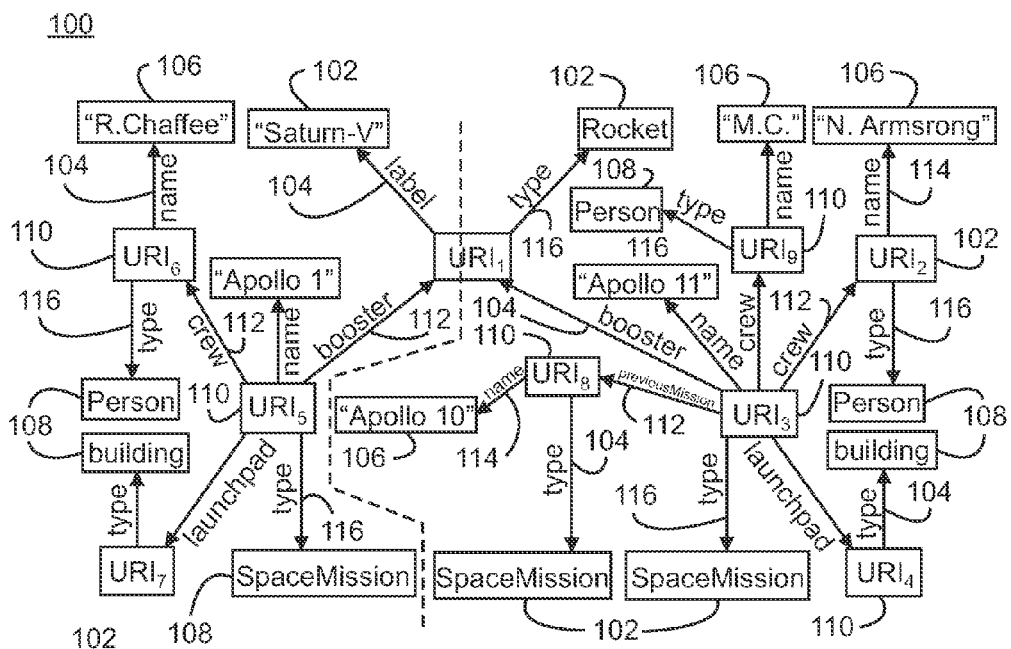
FIG. 1 is a representation of an embodiment of a resource description framework dataset graph for use in accordance with the present invention.

A resource description framework (RDF) dataset is a graph, i.e., an RDF graph, containing a plurality of triples. Each triple is formed by a subject, a predicate and an object such that the predicate connects the subject to the object. Therefore, a triple is regarded as a directed edge (the predicate) connecting two vertices, subject and object. Referring initially to FIG. 1, an exemplary embodiment of an RDF dataset viewed as a directed graph 100 is illustrated. The directed graph contains a plurality of nodes or vertices 102 with arrows 104 extending between the vertices. The arrows 104 are the edges and represent the predicates. The vertices 102 represent the subjects and objects. As big RDF datasets, for example, DBpedia and the Link Open Data cloud, are becoming the hub for disparate knowledge bases, the World Wide Web Consortium (W3C) has provided a set of unified vocabularies as part of the RDF standard to encode the rich semantics. The rdfs: type predicate (or "type" for short) is particularly useful in generating the summarization in accordance with the present invention. For example, as illustrated in FIG. 1, the space mission "Apollo 11" in the entity vertex $URI_3$ has a type SpaceMission.

The use of the prescribed unified vocabularies on an RDF graph facilitates a classification of vertices and edges into three distinct groups, string vertices 106, type vertices 108 and entity vertices 110. $V_E$ is the set of entity vertices 110, i.e., uniform resource identifiers (URIs), and $V_T$ is the set of type vertices 108. $V_W$ is the set of keyword vertices 106. The division on vertices results in a corresponding division on the RDF predicates, i.e., the edges in a directed graph. The RDF graph includes entity-entity predicates 112, entity-keyword predicates 114 and entity-type predicates 116. $E_R$ is the set of edges for entity-entity predicates, i.e., connecting two vertices in $V_E$. $E_A$ is the set of edges for entity-keyword predicates, i.e., connecting an entity to a keyword, and $E_T$ is the set of edges for entity-type predicates, i.e., connecting an entity to a type. The main structure of an RDF graph is captured by the entity-entity predicates or edges 112 represented by the set $E_R$. Using these set representations, a given RDF dataset is viewed as an RDF graph G=(V,E), where V is the union of disjoint sets, $V_E$, $V_T$ and $V_W$, and E is the union of disjoint sets $E_R$, $E_A$ and $E_T$.

Figure 2:
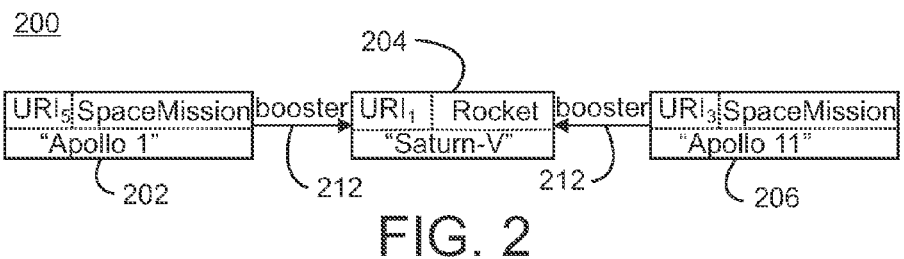
FIG. 2 is an illustration of an embodiment of a condensed portion of a resource description framework dataset graph.

An alternate view of the RDF dataset is generated by treating a given entity vertex along with its associated type and keyword vertices as a single combined vertex. For example, the entity vertices $URI_5$, $URI_1$ and $URI_3$ from FIG. 1, along with their types and keywords, can be viewed as the combined vertex structure 200 illustrated in FIG. 2. As illustrated, the combined vertex structure includes three vertices, a $URI_5$ vertex 202, a $URI_1$ vertex 204 and $URI_3$ vertex 206. Each combined vertex includes an identification of the entity, the type and the keyword from the corresponding vertices. The edges, i.e., predicates, between these vertices and the associated entity vertex are removed. However, the entity-entity predicate edges 212 between the entity vertices are maintained. As illustrated, the entity-entity predicates between pairs of vertices are the same. This alternate view of the RDF dataset can be incorporated into the RDF graph G.

For an RDF graph G={V,E}, the alternate view of the RDF dataset is incorporated to generate the condensed view of the RDF graph G, denoted as $G_c=\{V_E', E_R\}$. While $|V_E'|=|V_E|$, every vertex $v' \in V_E'$ contains not only the entity value of a corresponding vertex $v \in V_E$, but also the associated keywords and types of v. For ease of presentation, a single keyword and a single type are associated to each entity, which works for the general case without additional effort or cost. In addition, hereinafter, G={V,E} is used to represent the condensed view of an RDF graph.

SPARQL is a pattern-matching query language. For example, to extract the vertices that are connected by predicates LaunchPad and Booster in FIG. 1, the following SPARQL query of two conjunctive triple patterns is used:

SELECT*WHERE{?xlaunchPAD?y.?xbooster?z. OPTIONAL{?xpreviousMission?w}}

The actual bindings for the variables (whose names begin with "?") are retrieved by evaluating the query on the dataset. An optional triple pattern is provided in the query, where its matching is not enforced in the evaluation of the query. Evaluating the query on the data in FIG. 1 retrieves two spacemissions. $?x=URI_3$ and $?x=URI_5$. The state-of-the-art RDF stores do not support keyword queries, especially for keyword queries that try to find subgraphs connecting all the query keywords.

Given a condensed RDF graph G={V,E}, for any vertex $v \in V$, let w(v) be the keyword stored in v. Formally, a keyword search query q in an RDF data G={V,E} is defined by m unique keywords $\{w_1, w_2, \ldots, w_m\}$. A set of vertices $\{r, v_1, \ldots, v_m\}$ from V is a qualified candidate when:

$r \in V$ is a root answer node and $v_i \in V$ for $i \in [1, m]$, and $w(v_i)=w_i$.

If we define the answer for q as A(q) and the set of all qualified candidates in G with respect to q as C(q), then $$A(q) = \min_{g \in C(q)} \sum_{r \in g, v_i \in g, i=1 \ldots m} d(r, v_i) \quad (1)$$

where $d(r, v_i)$ is the graph distance between vertices r and $v_i$ when treating G as an undirected graph. Intuitively, this definition looks for a subgraph in an RDF graph that has minimum length to cover all query keywords from a root node r. In prior works concerning keyword search in RDF data, the graph distance of $d(v_1, v_2)$ is simply the shortest path between $v_1$ and $v_2$ in G, when each edge is assigned a weight, i.e., distance. By default, every edge in E has a weight of 1. In this case, $d(v_1, v_2)$ simply gives the minimum number of hops required to move from $v_1$ to $v_2$ in G. When $v_1$ and $v_2$ belong to disconnected parts of G, i.e., $v_1$ cannot reach $v_2$ at all, $d(v_1, v_2)=+\infty$.

In addition, equation (1) defines the answer of a keyword search query in G as the subgraph g in G that connects all query keywords with the minimum sum of weights from a root node $r \in g$ to every other query keyword node in g. This problem is extended to the top-k version, when a user supplies an integer parameter k. The answer is the top k qualified candidates from C(q) that minimize the value of equation (1). By defining the score of a qualified candidate $g \in C(q)$ as $s(g)=\Sigma_{r \in g, v_i \in g, i=1 \ldots m}d(r, v_i)$, all qualified candidates in C(q) can be ranked in an ascending order of their scores. The i th ranked qualified candidate is referred to as A(q,i). The answer to a top-k keyword search query q is simply an ordered set $A(q,k)=\{A(q,1), \ldots, A(q,k)\}$. A(q) is a special case when k=1, and A(q)=A(q,1), assuming that the answer roots in A are distinct.

Many techniques for keyword searching on generic graphs assume that graphs will fit within memory. This assumption, however, is unrealistic for common, large RDF graphs. In addition, certain approaches maintain a distance matrix for all vertex pairs. These approaches do not scale for graphs containing millions of vertices. In addition, previous approaches do not consider how to handle updates.

One approach is the baseline method. A baseline solution is based on the "backward search" heuristic on generic graphs. Intuitively, the "backward search" for the root node r starts simultaneously from each vertex in the graph G that corresponds to a query keyword and expands to its neighboring nodes recursively until a candidate answer is generated. A termination condition is used to determine whether the search is complete. Keyword searching on RDF graphs that applies backward searching utilizes a termination condition to stop the search whenever the expansions originating from m vertices $\{v_1, \ldots, v_m\}$ and corresponding to m distinct query keywords meet at a node r for the first time. Therefore, the set $\{r, v_1, \ldots, v_m\}$ is returned as the answer. Unfortunately, this termination condition is incorrect. Using the above termination condition, the three expansions for the three vertices $\{v_1, v_2, v_6\}$ covering the query keywords $q=\{w_1, w_2, w_3\}$ meet for the first time in the second iteration, so the candidate answer $g=\{r=v_4, v_1, v_2, v_6\}$ is returned and s(g)=6. Continuing to the next iteration, the three expansions meet again at $v_3$, with $g'=\{r=v_3, v_1, v_2, v_6\}$ and s(g')=5, which is the correct answer. Even if this error in the terminating condition is corrected, incorrect results are still returned due to the limitations in the summary that is built.

In addition to these limitations, the backward method is not scalable for large disk-resident RDF graphs as it initiates many random accesses to the data on disk and constructs numerous search paths in order to complete the search. However, the majority of the random accesses and search paths will not produce any answers. In order to perform the backward search only on the most promising sections of the RDF dataset, exemplary embodiments in accordance with the present invention create and utilize a type-based summarization of the RDF dataset. By operating the keyword search initially on the type-based summary, which is much smaller than the actual underlying RDF dataset, large portions of the RDF dataset graph that are irrelevant to a given query are eliminated. This also reduces the computation cost and facilitates the handling of larger RDF graphs. In accordance with exemplary embodiments of the present invention, partitions are induced over the RDF graph G based on the types in G. To build these partitions, the inherent structures that are unique to the RDF dataset are leveraged. In general, RDF graphs contain types for their vertices. The distinct number of types in a RDF graph G is usually much smaller than the number of vertices in G. The interconnections or relationships among different types in a given RDF graph are inferred from the relationships between entity vertices in the graph and are used to summarize the common structures of the condensed RDF graph G.

Figure 3:
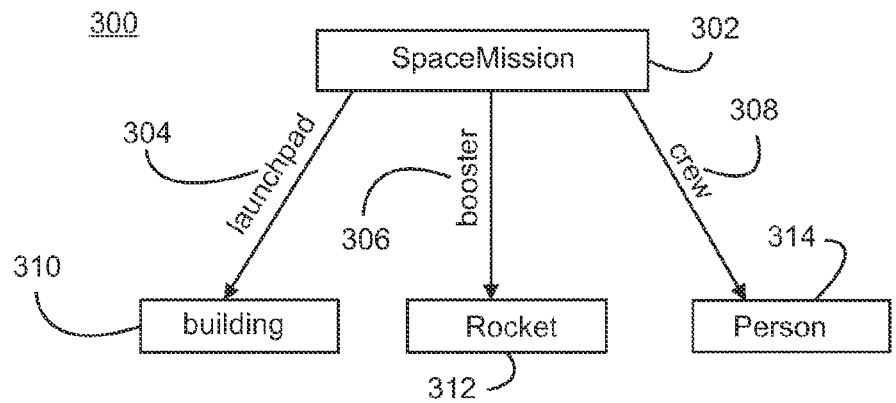
FIG. 3 is an illustration of an embodiment of type based common structures derived from a resource description framework dataset graph.

Neighborhoods in close proximity around vertices of the same type often share similar structures in how they connect to vertices of other types. Considering the RDF graph illustrated in FIG. 1, FIG. 3 illustrates a common I-hop neighborhood structure 300 around both nodes $URI_3$ and $URI_5$ with the type SpaceMission 302. That is, a given entity vertex of type SpaceMission 302 typically also has connections to other vertices along the predicates launchpad 304, booster 306 and crew 308. These vertices are entity vertices. i.e., URIs, having the types building 310, rocket 312 and person 314, respectively. Therefore, a condensed type based graph is generated containing only the types linked through by relationships defined by the entity nodes or vertices and the predicates between given entity nodes. As illustrated, spacemission type data are related to building type data in that a building is the launch pad for the spacemission. Similarly, rocket is a type of booster used for a spacemission, and persons are a type of crew associated with spacemissions. These common type structures are defined by and linked by the underlying data found in the entity vertices and are used to build a type-based summarization for RDF graphs.

In order to generate the common type based structures, the RDF graph is initially split into a plurality of smaller partitions. Then, a minimal set of common type based structures is defined that summarizes each partition. The summarization maintains distinct structures from all the partitions. In general, keyword searching benefits from the summarization, because the summarization obtains the upper and lower bounds for the distance traversed in keyword exploration without frequently turning to the RDF dataset stored, for example, on disk and provides for the efficient retrieval of every partition from the RDF dataset by interacting with RDF query engine. The summarization is kept as small as possible without compromising these searching benefits so that it can be cached in memory for query optimization.

The present invention utilizes two notions from graph theory, graph homomorphisms and the core of a graph. As illustrated in FIG. 3, type vertices that are at close proximity are used to generate partitions of the RDF data graph. However, partitions that are exactly the same across the whole graph represent a large number, which results in a large summary graph S(G). The size of S(G) is reduced by discovering homomorphisms among the induced partitions. A graph homomorphism $f$ from a graph G=(V, E) to a graph G'=(V', E'), written as $f:G \rightarrow G'$, is a mapping function $f:V \rightarrow V'$ such that $(u,v) \in E$ implies $(f(u), f(v)) \in E'$. When such an $f$ exists, G is homomorphic to G'.

Figure 4:
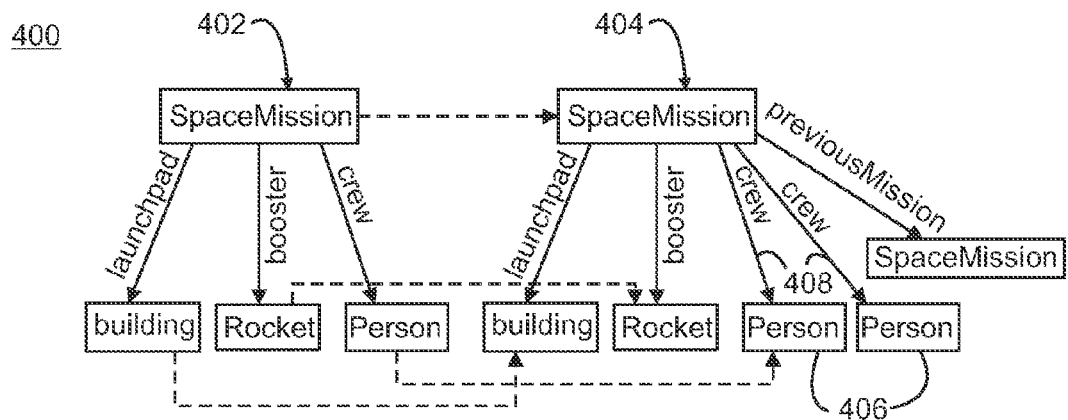
FIG. 4 is an illustration of an embodiment of graph homomorphism in type based summaries of a resource description framework dataset graph.

Referring to FIG. 4, an illustration of a graph homomorphism in the type-based summaries or partitions 400 of the present invention is illustrated. A first type based structure 402 and a second type based structure 404 summarize the type-based structure around vertex $URI_5$ and vertex $URI_3$ from FIG. 1. The first type based structure is a substructure of the second type based structure. Therefore, instead of keeping both structures in the summary, only the second type based structure is maintain in the summary as it contains all of the information contained in the first type based structure. The first type based structure appears in the second type based structure by homomorphism. This limits the length of any backward expansion in the first type based structure by only considering the correspondent path in the second type based structure. Homomorphism is transitive, i.e., $G \rightarrow G'$ and $G' \rightarrow G''$ imply $G \rightarrow G''$.

A core is a graph that is only homomorphic to itself, but not to any one of its proper subgraphs. Formally, a core c of a graph G is a graph with the following properties: there exists a homomorphism from c to G; there exists a homomorphism from G to c; and c is graph having these properties that has a minimal number of vertices. Therefore, cores reduce the size of a given graph and replace it with a graph having a minimum number of vertices. Therefore, homomorphisms are used to reduce the number of partitions, and cores are used to reduce the size of any given partition or summary or partitions. In one exemplary embodiment in accordance with the present invention, a core is identified for each one of the plurality of partitions before homomorphisms are used to generate the summaries. Alternatively, homomorphisms are used to generate the summaries and a core is identified for each generated summary.

Figure 5:
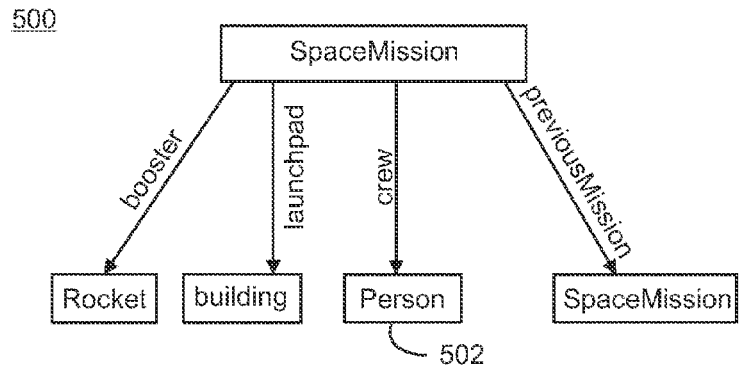
FIG. 5 is an illustration of an embodiment of a summary containing only cores.

Referring again to FIG. 4, the first type based structure 402 and second type based structure 404 can be replaced, if possible, by cores. In the second type based structure 404 there are two person type vertices 406 connected by the identical predicate crew 408. One of these vertices can be removed using the concept of core to generate the reduced type based structure 500 illustrated in FIG. 5. The reduced type based structure has only 5 vertices as opposed to 6 in the original second type based structure 402. This is accomplished by removing one of the person type vertices so that only a single person type vertex 502 remains in the reduce type based structure. The first type based structure and the reduced type based structure are then used to generate the summary based on homomorphism. In order to retrieve the original partitions from before the application of cores and homomorphisms, a history of the reductions, mergers and optimizations, i.e., cores and homomorphisms, is created and is maintained with each summary and each partition. This history is used to reconstruct the original partitions as required in response to queries over the RDF dataset.

Partitioning splits the input RDF dataset G into a plurality of smaller but semantically similar and edge disjoint subgraphs. Given that nodes with the same type often share similar type-neighborhoods, a distinct set of partitions for G are induced based on the types in G, using small subgraphs surrounding vertices of the same type. The partitioning algorithm treats an input RDF dataset as a directed graph G concerning only the type information, i.e., the condensed view of an RDF graph with each vertex only keeping its type information. For any vertex that does not have a type specified by the underlying dataset, a universal type, NA, is assigned. Systems and methods in accordance with the present invention build semantically similar partitions.

If the RDF dataset graph G{V,E} has n distinct number of types $\{T_1, \ldots, T_n\}$, and $V_i$ represents the set of vertices from V that have a type $T_i$, the $\alpha$-neighborhood surrounding a vertex is defined, where $\alpha$ is a parameter used to produce a set of edge disjoint partitions P over G. For any vertex $v \in V$ and a constant $\alpha$, the $\alpha$-neighborhood of v is the subgraph from G obtained by expanding v with $\alpha$ hops in a breadth-first manner, denoted $h(v, \alpha)$, subject to the constraint that the expansion only uses edges which have not been included yet in any partition in P. The i-hop neighboring nodes of v are defined as the set of vertices in G that can be connected to v through a directed path with exactly i directed edges. Since directed edges are used, the i-hop neighboring nodes of v can be an empty set. The nodes in $h(v, \alpha)$ are a subset of the $\alpha$-hop neighboring nodes of v since some may have already been included in another partition. To produce P, P is initialized to be an empty set and iterated through a plurality of different types. For type $T_i$ and each vertex $v \in V_i$, the α-neighborhood $h(v, α)$ is found and $h(v, α)$ is added as a new partition into P.

Figure 6:
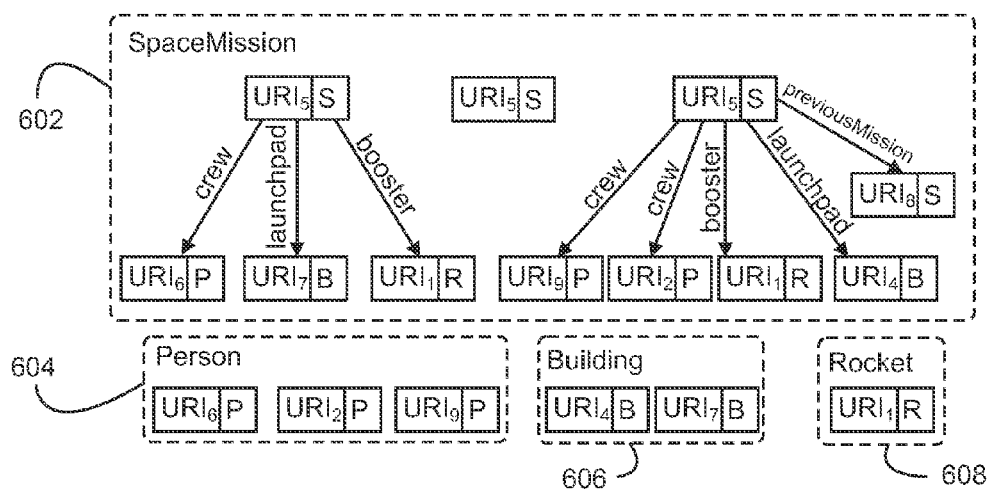
FIG. 6 is an illustration of an embodiment of partitions generated from a resource description framework dataset graph.

To summarize the properties of the partitions constructed in accordance with the present invention, the partitions in P are edge disjoint, and the union of all partitions in P covers the entire graph G. The order of iteration through different types may affect the final partitions P. However, no matter which order is chosen, vertices in the same type always induce a set of partitions based on their α-neighborhoods, which is what matters for building good summarization structures. Therefore, in general any traversal order over different types will yield a good partition of G to be used in the summarization procedure, as long as partitions are produced using small subgraphs surrounding entity vertices of the same type. Different traversal orders over the types might still lead to the same partitions P. Since G is treated as a directed graph, the inherent type structures in G already pose a limitation on what their $h(v, α)$'s will be regardless of the current state in P, i.e., the traversal order. For example, the partitions P for the RDF dataset of FIG. 1 are illustrated in FIG. 6, using α=1. The illustrated set of partitions 600 include four partitions for four different types, spacemission 602, person 604, building 606 and rocket 608. Sets of vertices are identified for each type, and the vertices in each common type set are expanded a single hop, α=1, as described above to create an edge distinct partition set of vertices for each common type set vertex.

Figure 7:
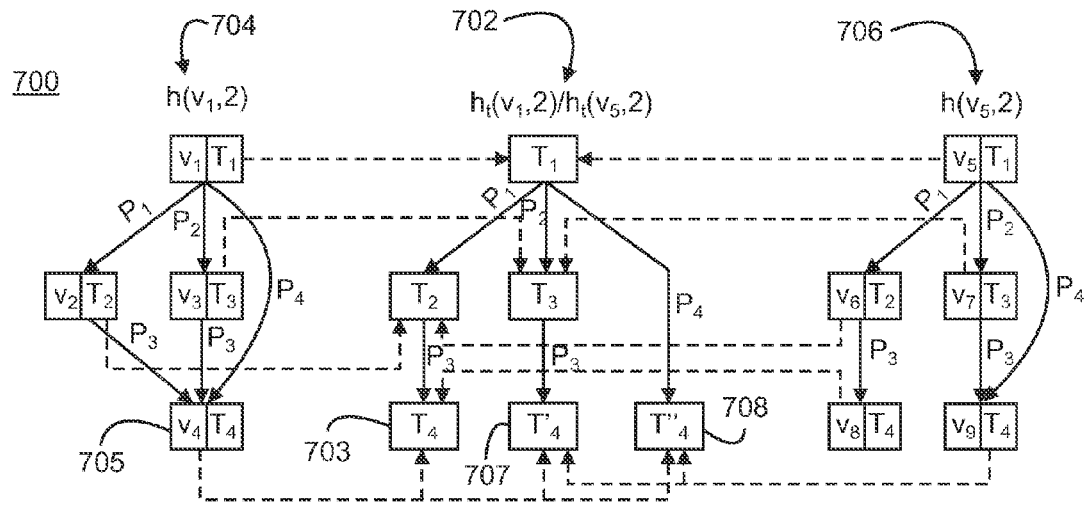
FIG. 7 is an illustration of an embodiment of a covering tree structure for two partitions.

Having generated the plurality of partitions, a summary S(G) for the RDF dataset graph G is generated. The summary is initialized to an empty set, and each partition $h(v, α)$ in P is considered by visiting the α-neighborhood of v in a breadth-first manner. During this traversal, a covering tree is constructed for the edges in $h(v, α)$, denoted $h_t(v, α)$. For each visited vertex in $h(v, α)$, its type is extracted and a new node is created in $h_t(v, α)$ even if a node for this type already exists. A tree $h_t(v, α)$ is built that represents all the distinct type-paths in $h(v, α)$. Referring to FIG. 7, an example of the mapping of two separate partitions to the same covering tree 700 is illustrated. A covering tree $h_t(v_1, 2)$ 702 is built for the first partition $h(v_1, 2)$ 704. The vertex $v_4$ 705 in the first partition is visited three times in the traversal across three different paths through the first partition using single hops from vertex to vertex. This yields three distinct nodes in the covering tree with the same type, designated $T_4$, $T_4$ 703, $T'_4$ 707 and $T''_4$ 708 in $h_t(v_1, 2)$. In addition, an isomorphic structure to tree $h_t(v_1, 2)$ 702 is $h_t(v_5, 2)$, which resulted from the partition $h(v_5, 2)$ 706. This illustrates two advantages of building type-based covering trees. First, the size of the resulting summary S(G) can be reduced. As illustrated in FIG. 7, two partitions with distinct structures at the data level, e.g., $h(v_1, 2)$ and $h(v_5, 2)$, share an identical structure at the type level. Taking advantage of such overlaps is the easiest way to reduce the number of distinct structures in S(G). The second advantage is efficiency. Building S(G) necessitates testing for subgraph isomorphism. Whereas this is computationally hard for generic graphs (NP-complete), there are polynomial time solutions for the problem since the testing on trees can be restricted, leading to improved efficiency in constructing S(G).

The size of the summary tree structure $h_t$ for a partition is further reduced by extracting its core and using it to represent the structure of the partition. This is achieved with a bottom up and recursive procedure in which homomorphic branches are merged under the same parent node in a given summary tree. An example of such a merging is shown in the reduced type based structure 500 illustrated in FIG. 5, which reduces the type based structure to 5 vertices from the 6 vertices appearing in the original second type based structure 402 of FIG. 4. The two triples represented by vertices SpaceMission and person connected by edge crew are merged so that only a single triple remains. This merging procedure is used to condense each summary tree structure $h_t$ to its core. Again, the merging steps used to generate the core for any given summary tree are logged and stored in association with the summary tree structure core.

Once a core c is constructed for a given partition, the existing summary structures in (G) are scanned to check if any existing structure h' in S(G) is homomorphic to c or if c is homomorphic to any existing structure h' in S(G). In the former case, h' is removed from S(G) and the scan is continued. In the latter case, the scan is terminated, and S(G) is returned without c. When S(G) is empty or c is not homomorphic to any of the structures in (G) after a complete scan on S(G), c is added into S(G), and S(G) is returned.

To facilitate keyword searching, a plurality of auxiliary, i.e., inverted, indexes are maintained in combination with the summary of the RDF graph. A portal node l is a data node that is included in more than one partition. This is possible because the partitions are created to be edge-disjoint and not node disjoint. A portal node joins different partitions. A partition may have multiple portals but typically has fewer portals than the total number of nodes in the partition. Portal nodes allow different partitions to be pieced together. In a first index, for each partition h, a unique id, pid is assigned and associated with the list of portals in that partition. Since $h_t(v, α)$ is used to represent $h(v, α)$, where a vertex in $h(v, α)$ could correspond to more than one vertex in $h_t(v, α)$, $J(v_i)$ can represent the mappings in $h_t(v, α)$ for a vertex $v_i$ in $h(v, α)$. All vertices in $J(v_i)$ are of the same type. Let $J=\{J(v_i)|v_i \in h(v, α), |J(v_i)|>1\}$. Considering the first partition $h(v_1, 2)$ and the covering tree for the first partition $h_t(v_1, 2)$ as illustrated in FIG. 7, $J=\{J(v_4)=\{T_4, T_4', T_4''\}\}$. The second index is to map the pid of h to J.

A third index maps data nodes in partitions to summary nodes in S(G). In particular, a unique id, sid is assigned to each summary in S(G) and each node in S(G) is denoted with a unique id nid. For any data node u in a partition $h(v, α)$ with partition id pid, d is defined as the distance of u from v. This third index maps the data node u in $h(v, α)$ to an entry that stores the partition root v, the partition id, the distance d, the id sid of the summary and the id nid of the summary node that u corresponds to.

Figure 8:
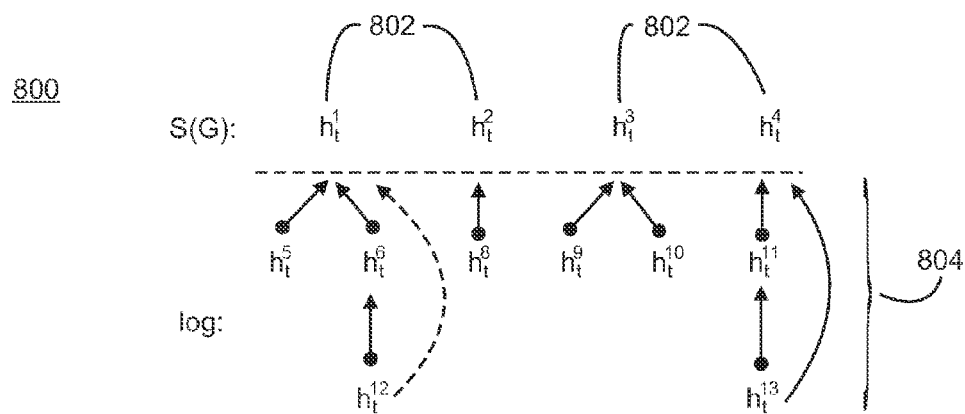
FIG. 8 is an illustration of an embodiment of all homomorphisms used to build a summary graph of a resource description framework dataset graph.

In order to obtain the homomorphic mappings from each $h_t(v, α)$ to a summary in S(G), a log is maintained for all the homomorphism found during the construction of S(G). Once S(G) is finalized, the mappings in this log are traced to find all the mappings from data to summaries. As each partition, i.e., represented by its core, is either in the final S(G) or is homomorphic to one other partition, the size of the log is linear to G. Referring to FIG. 8, an exemplary embodiment of a homomorphism log 800 is illustrated, where $h_t^i$ is the covering tree for the $i^{th}$ partition. The homomorphism log includes sets of trees 802 in combination with their homomorphic mappings 804. Each set is associated with one of the summaries in S(G) that all trees in that set are homomorphic to. To find the final mappings, each set of trees in the log is scanned, and the homomorphisms of each entry are mapped in a set to the corresponding entry from S(G).

Exemplary embodiments of systems and methods in accordance with the present invention utilize a scalable and exact search algorithm by leveraging graph partitions and the summarization of the present invention. In accordance with one embodiment, a two-level backward search is conducted. One backward search is conducted at the summary level, and one backward search is conducted at the data level. For identified connected partitions that are found to contain all the distinct keywords at the summary level, a backward search at the data level is initiated. Path length computation is at the heart of backward search. While working at the summary level, exact path lengths are not available. Therefore, the path length of the actual data represented by the summary is estimated.

At the summary-level, any shortest path in the underlying RDF graph passes through a plurality of partitions. For each partition the path includes two of its portals, i.e., an entrance and an exit node. By construction, the distance from the root node v of a partition to any vertex u in the same partition is known and has been indexed. By triangle inequality, the distance $d(v_1, v_2)$ for any two vertices $v_1$ and $v_2$ in a partition with a root node v can be upper bounded by $d(v_1, v_2) \leq d(v, v_1) + d(v, v_2)$, and lower bounded by $d(v_1, v_2) \geq |d(v, v_1) - d(v, v_2)|$. A possibly tighter lower bound can be found by using the summary and the recognition that given two graphs g and h, if $f: g \to h$, then $\forall v_1, v_2 \in g$ and their homomorphic mappings $f(v_1), f(v_2) \in h$, $d(v_1, v_2) \geq d(f(v_1), f(v_2))$.

Figure 9:
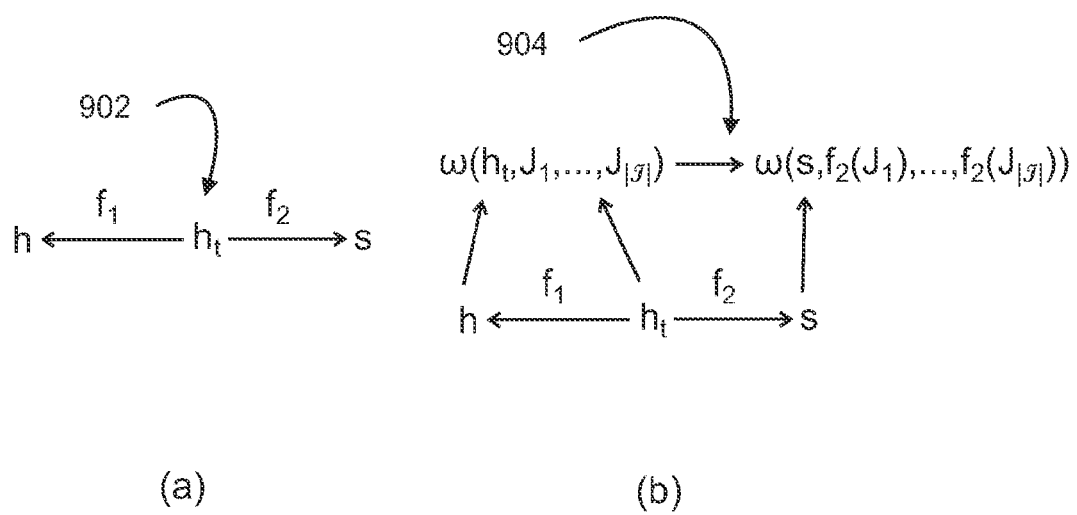
FIG. 9 is an illustration of an embodiment of homomorphic mappings from partitions, through covering tress to the summary graph.

Referring to FIG. 9, homomorphic mappings between a partition h, its covering tree $h_t$, and its summary s in S(G) are illustrated 902. There is no direct homomorphic relation between h and s. In order to obtain a lower bound for the distance of any two vertices in h, a homomorphic structure is constructed for h. First, a mapping function ω is defined that outputs a new graph g'(V', E') from a given graph g(V,E). The mapping function ω takes as input g and a set of vertices of the same type $J=\{v_0, v_1, \ldots\} \subseteq V$, denoted as ω(g,J). Next, $v_0$ is added to V' to represent all vertices in J. Then, $\forall v \in V-J$, v is added to V'. Finally, $\forall (u,v) \in E$, add $(u,v) \in E'$ if u, $v \notin J$, or add $(v_0, v)$ or to E' if $u \in J$ or $v \in J$ respectively. In addition, labels are copied accordingly. Therefore, a homomorphism exists from g to ω(g,J).

A homomorphism for h is derived by using ω and its summary s. Initially, h is constructed from $h_t$ by recursively applying ω on $h_t$, with each $J \in J$ as input, denoted as $\omega(h_t, J_1, \ldots, J_{|J|}) = \omega((\ldots \omega(h_t, J_1)\ldots), J_{|J|})$. The set J can be retrieved by the stored indexes. For example, in FIG. 8, $J=\{J=\{T_4, T_4', T_4''\}\}$. Applying $\omega(h_t(v_1, 2), J)$ results in a structure that is isomorphic to the partition $h(v_1, 2)$. Again in FIG. 8, the mapping $\omega(h_t(v_5, 2), J)$ can be rewritten by the associativity of ω as nested ωs, i.e., $\omega(\omega(h_t(v_5, 2), \{T_4', T_4''\}), \{T_4, T_4'\})$. Applying the inner mapping generates an isomorphic structure to partition $h(v_5, 2)$, while applying the outer mapping returns a homomorphism of $h(v_5, 2)$. Using these properties and the transitivity of homomorphism, a homomorphism for any partition h can be constructed. However, there is a practical issue as $h_t$ is not explicitly stored. Only a summary s is kept to represent the structure of $h_t$, where $h_t$ is homomorphic to s. Thus, a homomorphism for h is constructed through s.

Letting $h_1$ and $h_2$ represent two partitions, and supposing $f:h_1 \to h_2$, $h_1' = \omega(h_1, J)$ and $h_2' = \omega(h_2, f(J))$, where $J \in J$ of $h_1$, there exists $f':h_1' \to h_2'$. This implies that by merging J on $h_t$, i.e., $\omega(h_t, J)$, and merging $f_2(J)$ on its summary s, i.e., $\omega(s, f_2(J))$, there is a homomorphism from $\omega(h_t, J)$ to $\omega(s, f_2(J))$. It follows that $\omega(h_t, J_1, \ldots, J_{|J|})$ is homomorphic to $\omega(s, f_2(J_1), \ldots, f_2(J_{|J|}))$. As discussed above, h is homomorphic to $\omega(h_t, J_1, \ldots, J_{|J|})$; therefore, h is homomorphic to $\omega(s, f_2(J_1), \ldots, f_2(J_{|J|}))$. Here, $f_2$ is a part of the third auxiliary inverted index, which maps a vertex in data to a vertex in summary. Referring again to FIG. 9, the relations of homomorphisms 904 are illustrated. Given any two vertices in a data partition, its shortest distance can be lower bounded by combining the methods described above and using any shortest path algorithm on $\omega(s, f_2(J_1), \ldots, f_2(J_{|J|}))$. In one embodiment, the larger lower bound from either the summary or the triangle inequality is used.

The set $\{W_1, W_2, \ldots, W_m\}$ is defined, where $W_i$ is the set of vertices in G that contains query keyword $w_i$, and m priority queues $\{a_i, \ldots, a_m\}$ are initialized. A set M of entries is maintained, one for each considered partition. Each entry stores a partition id pid followed by m lists. The $i^{th}$ list records all the reachable vertices found so far that contain keyword $w_i$ and how they connect to the partition pid, in the form of quadruples—(vertex, S, $d_l(S)$, $d_u(S)$). M tracks what keywords have reached its associated partition in their backward partition-based expansion. In the quadruple, the vertex stands for the first vertex in the backward expansion; the expansion reaches the current partition by routing through a sequence of the portals from some partitions, stored in S as a sequence of (portal, partition) pairs.

A sequence S defines a path that begins at vertex. For instance, a sub-sequence $\{(l, pid_a), (l', pid_b)\}$ means the indicated path enters the partition $pid_b$ at the portal l (exiting from partition $pid_a$) and uses l' as its next portal for exit. The interest is for the shortest path that connects a portal to its next portal in a sequence. The lower and upper bounds for the length of this path defined by S are denoted as $d_l(S)$ and $d_u(S)$. For example, where m=2 and an entry for a partition pid in M, an entry for keyword $w_1$ is $t_1=(v_1, \{(l_2, pid_0)\}, 5, 7)$, which indicates that there is a path (of partitions) from $w_1$ that reaches pid. This path starts at $v_1$, enters pid at portal $l_2$ and has a length of at least 5 hops and at most 7 hops. To reach pid, it passes through $pid_0$. For a second keyword $w_2$, pid is reachable from $v_2$ and $v_3$ as indicated by $t_2=(v_3, \{(l_1, pid_4), (l_0, pid_5)\}, 3, 5)$ and $t_3=(v_2, \{(l_3, pid_2)\}, 5, 6)$.

Like the BACKWARD methods, the algorithm proceeds in iterations. In the first iteration, for each vertex v from $W_i$, the pid of the partition is retrieved that contains v, from the third inverted index. Next, if there is an entry for pid in M, a quadruple t=(v, (nil), 0, 0) is appended to the $i^{th}$ list oldie entry. Otherwise a new entry for pid in M is initialized with m empty lists, and the $i^{th}$ list is updated with t. In addition, an entry (pid, t) is added to the priority queue $a_i$. Entries in the priority queue are sorted in ascending order by their lower bound distances. This process is repeated for all $W_i$'s for i=1, ..., m, which completes the first iteration.

In the $j^{th}$ iteration, the top entry is popped from $a_i$, for example (pid, (v, S, $d_l(S)$, $d_u(S)$)). The last pair in S is said to be (l, $pid^l$), and for the partition pid, its portals $£=\{l_1', l_2', \ldots\}$ are found from the first inverted index. Then, for each l' in £, the lower and upper bounds $d_l'$ and $d_u'$ in the partition are computed from l (or v if l=nil) to l' using the approach discussed above. From the inverted index, a portal l' connects pid to a set of neighboring partitions, for example a set P' of partitions. For each partition pid'∈P', a quadruple t'=(v, S'=S∪(l', pid), $d_l(S)+d_l'(l, l')$, $d_u(S)+d_u'(l, l')$) is constructed.

In addition, the entry for pid' in M is searched, and its $i^{th}$ list is updated in the same way as for the first iteration. But t' is only appended to the $i^{th}$ list if the following two conditions are satisfied. First, for every t''=(v'', S'', $d_l''(S)$, $d_u''(S)$) in the $i^{th}$ list, if l' is the last portal in S'', then $d_u'' \geq d_l(S)+d_l'(l, l')$. Second, l' is not in S, i.e., no cycle. Finally, if t' has indeed been appended, (pid', t') is inserted to $a_i$, which completes the $j^{th}$ iteration.

At any iteration, if a new quadruple t has been appended to the $i^{th}$ list of an entry pid in M, and all of its m lists become non-empty, then partition pid contains potential roots for a candidate answer.

First, all the possible combinations of the quadruples from the other (m−1) lists are found, one from each list, and combined with t, denoted as (pid, $(t_{1j_1}, \ldots, t_i, \ldots, t_{mj_m})$). This is referred to as a candidate subgraph, where $t_{ij}$ is the $j^{th}$ quadruple in the $l^{th}$ list. For example, letting $t_1$ be the new quadruple just inserted for the $1^{st}$ list in the entry for pid in M, since both of its lists are now non-empty, two candidate subgraphs can be found, i.e., (pid, ($t_1$, $t_2$)) and (pid, ($t_1$, $t_3$)). Using the information in a quadruple t, two subgraphs are found (linked by the partitions and their portals) that have candidate answers rooted at a node in partition pid.

To track the top-k answers, a priority queue is maintained for the top-k answers found so far. Once the partition, that contains the possible root of the candidate answers, is retrieved from the data, BACKWARD searching is used to find the answer roots at that partition. Instead of taking all the vertices in $W_l$ as input for the backward search, only vertices in $W_l$ that are part of the tailing portals are considered at each of the m sequences. Furthermore, the shortest path algorithm is used to find the distance from a portal to its succeeding portal in the respective partitions. For instance, for the candidate subgraph (pid, ($t_1$, $t_2$)), $d(v_1, l_2)$ is found on the partition $pid_0$ using the shortest path algorithm (similarly, $d(l_1, l_0)$ on $pid_5$) and backward search only is used on the partition pid with $\{l_0, l_2\}$ (and k) as the input.

Finally, in any iteration, whenever the same answer root with a different score is found, only the one with the smaller score is kept in the priority queue. To complete the algorithm, the correct termination condition can be found by letting (pid, (v, S, $d_l(S)$, $d_u(S)$)) be an entry in the priority queue. Then $\forall v' \in$ partition pid and for any path from v that is defined by S, it has $d(v, v') \geq d_l(S)$. In addition, let (pid, (v, S, $d_l(S)$, $d_u(S)$)) be the top entry in the priority queue $a_j$. Then for any explored path p from $w_i$ in $a_j$, it has $d(p) \geq d_l(S)$. The set of all unexplored partition ID's in G is denoted as $P_r$. For any pid that has not been included in M, clearly, pid$\in P_r$. The best possible candidate answer rooted at a node in partition pid is to use the current top entries from the m expansion queues, i.e., $a_1, \ldots, a_m$. Let these m top entries be ($pid_1$, ($v_1$, $S_1$, $d_l(S_1)$, $d_u(S_1)$)), ..., ($pid_m$, ($v_m$, $S_m$, $d_l(S_m)$, $d_u(S_m)$)), respectively. This yields the following results.

Let $g_1$ be the possible unexplored candidate answer rooted at a vertex in partition pid, with pid$\in P_r$, $$s(g_1) > \sum_{i=1}^{m} d_l(S_i). \quad (3)$$

Next, consider the set of partitions whose ID's have been included in M. Let the first entry from each of the m lists for a pid in M be: $t_1 = (v_1', S_1', d_l(S_1'), d_u(S_1')), \ldots, t_m = (v_m', S_m', d_l(S_m'), d_u(S_m'))$ Each list is sorted by the lower bound distance, and $t_j$=nil if the $j^{th}$ list of pid is empty or the path of its first entry is nil. Based on this, let the best possible unexplored candidate answer rooted at a vertex in partition pid, where pid$\in M$, be $g_2$, then $$s(g_2) > \sum_{i=1}^{m} f(t_i) d_l(S_i') + (1 - f(t_i)) d_l(S_i), \quad (4)$$

where $f(t_j)=1$ if $t_j \neq$ nil otherwise $f(t_j)=0$.

Finally, the termination condition is derived for the search. The score of the best possible answer in an unexplored partition is denoted as $s(g_1)$, as defined by the RHS of equation (3). In addition, the score of the best possible answer in all explored partitions as $s(g_2)$, as defined by the RHS of equation (4). Let g be the candidate answer in the priority queue with the $k^{th}$ smallest score. The search can safely terminate when $s(g) < \min(s(g_1), s(g_2))$. This algorithm is denoted the SUMM method. The SUMM method finds the top-k answers A(q, k) for any top-k keyword search query q on a RDF graph.

The SUMM algorithm uses the summaries to reduce the amount of data accessed during the backward search. For the algorithm to be effective, the subgraphs of the data graph that correspond to the different partitions should be efficiently identified. One option is to store the triples by partitions and index on their partition ID's, e.g., using the namegraph feature in any standard engine where each namegraph defines a partition. But then whenever an update on the partition happens, the index is updated. Furthermore, the approach enforces a storage organization that is particular to the present methods (i.e., not general). In one embodiment, an alternative efficient approach is used that has no update overhead and requires no special storage organization. Approaches in accordance with the present invention work by dynamically identifying the data of a partition using appropriately constructed SPARQL queries that retrieve only the data for that partition.

Since graph homomorphism is a special case of homomorphism on relational structure, the Homomorphism Theorem is used to characterize the results of two homomorphic graph query patterns. According to the Homomorphism Theorem, q and q' are relational queries over the same data D. Then $q'(D) \subseteq q(D)$ if $f$ there exists a homomorphism mapping $f$: $q \rightarrow q'$. Recall that $f_1: h_r \rightarrow h$ and for each $h_r$, a core c is extracted from $h_r$. By definition, c is homomorphic to $h_r$. Therefore, c is homomorphic to h (transitivity). Using c as a SPARQL query pattern can extract h due to the Homomorphism Theorem.

Addressing, two practical issues, there is usually a many-to-one mapping from a set of $h_r$'s to the same core c—leading to a low selectivity by using c as the query pattern. To address this issue, constants are bound from the targeted partition to the respective variables in query pattern. These constants could include the root and the portals of the targeted partition which are retrievable from the inverted indexes. The second issue is that in the construction of S(G), every e is not explicitly kept. Instead, c could be embedded (by finding homomorphism) to a summary $s \in S(G)$, where c is a subtree of s. To construct a SPARQL query from s, a mapping is found for the root node of the targeted partition in s. The triple patterns corresponding to the subtree in s are expressed in (nested) OPTIONALs from the root to the leaves. For example, the SPARQL query for the partition rooted at $URI_5$ using the summary in FIG. 7 is shown below. Notice that $URI_5$ is bound to the root to increase selectivity.

SELECT * WHERE{$URI_5$ name "A1". $URI_5$ type $^S$.
OPTIONAL{$URI_5$ lunchPad ?x. ?x type $^B$ .}
OPTIONAL{$URI_5$ booster ?y. ?y type $^R$ }
OPTIONAL{$URI_5$ crew ?z. ?z type $^C$ } .
OPTIONAL{$URI_5$ previousmission ?m. ?m type $^S$ } . }

One important limitation of previous work on summarizing RDF data is the inability to handle updates in the data in an incremental way. Summaries in accordance with exemplary embodiments of the present invention can be incrementally updated. This includes providing for insertion and deletion in the RDF graph dataset. Insertions are handled efficiently. A new subgraph, i.e., a set of triples, is simply treated as a data partition that has not been traversed. Indexing structures and the summarization are updated accordingly. Regarding deletions, let t be the triple deleted. Then all the partitions that visit the subject/object of t are updated. As a deletion only affects the nodes in the α-neighborhood of is subject and object, this can be done efficiently. To update S(G), there are two cases to consider. In the first case, if the core of an updated partition is not in S(G), i.e., it is homomorphic to a core in S(G). Its core is rebuilt, and the correspondent inverted indexes are updated. In the second case, if the core of an updated partition is in S(G), this will lead to a removal for the core in S(G). In addition, all the partitions homomorphic to the deleted core are retrieved and summarized together with the updated partition as if they are new data. To access these partitions efficiently, techniques discussed herein are utilized with the deleted core as the query pattern.

In accordance with one exemplary embodiment, the present invention is directed to systems for summarizing resource description framework datasets. These systems include one or more computers or computing systems that are in communication across one or more local or wide area networks. These include computing systems the have access to locations and other computing resources across the world wide web or Internet. The system also includes one or more databases that are in communication with the computer and that store the datasets and summaries of the present invention. The computer is capable of generating the datasets and summaries of the present invention and of processing user defined queries such as keyword searches over the datasets and summaries. Suitable computer, computing systems and databases are known and available in the art.

The database includes an identification of one or more resource description framework dataset graphs. Each resource description framework dataset graph includes a plurality of entity vertices associated with data accessible across the network. These entity vertices include, for example, an identification of the location of information or data accessible across the network, for example, URIs. In addition, the resource description framework dataset graph includes a plurality of type vertices associated with the entity vertices and indicating the type of a given entity vertex and a plurality of keyword vertices associated with the entity vertices. A plurality of predicate edges are provided in the resource description framework dataset graph to connect pairs of vertices selected from the entity vertices, type vertices and keyword vertices.

The database includes a plurality of partitions. Each partition represents a portion of the vertices and predicate edges from the resource description framework dataset graph. The plurality of partitions are preferably a plurality of predicate edge disjoint partitions, and the union of all predicate edge disjoint partitions represents the entire resource description framework dataset graph. In one embodiment, a condensed view of the resource description framework dataset graph is used. Therefore, the database includes this condensed view of the resource description framework dataset graph. The condensed view includes a plurality of condensed vertices linked only by inter entity vertex predicate edges from the resource description framework dataset. These are predicate edges between pairs of entity vertices in the original dataset graph. Each condensed vertex is associated with an entity vertex in the resource description framework dataset graph; however, the vertices in the condensed view only contain type information from a given type vertex associated with that entity vertex. Therefore, the condensed view of the dataset graph is a type based view, and the types are linked by the structure of the original dataset graph as defined by the relationships among the entity vertices.

In one embodiment, the condensed view is used to generate the partitions, and each partition in the plurality of partitions includes a portion of the condensed vertices and the inter entity vertex predicate edges from the condensed view of the resource description framework data graph. Each partition can be formed from one or more predicate edge disjoint subgraphs, where each subgraph is formed starting at a given condensed vertex and adding condensed vertices extending out a predetermined number of hops through the condensed view of the resource description framework from the given condensed vertex. In one embodiment, the given condensed vertices from which the predicate edge disjoint subgraphs in a given partition are initiated comprise common type information. Therefore, each partition represents subgraphs around a common type of vertex from the condensed view.

A minimum set of common type based structures summarizing the plurality of partitions is stored in the database. This summary is used for purposes of keyword searching. The minimum set of common type based structures summarizes the plurality of partitions. In addition to using the condensed view of the dataset graph and the partitions, the size of the summary can be further reduced using cores and homomorphisms. Therefore, the summary stored in the database includes a plurality of covering trees representing the plurality of partitions. Each covering tree represents all distinct paths through the vertices of the partitions. Since a given covering tree may contain, for example, duplicate nodes or branches, the covering tree has a core that contains a minimum number of vertices for the covering tree. Each core in the plurality of covering trees cores in the minimum set of common type based structures represents a superset of other covering tree cores having common type based information that are not include in the minimum set of common type based structures. This is accomplished by adding covering tree cores to the summary using a process that employs homomorphisms.

The database also includes a plurality of auxiliary indexes in combination with the minimum set of common type based structures. The plurality of auxiliary indexes takes into account the condensing of the dataset graph, the creation of partitions and the generation of the summary using cores and homomorphisms such that it is sufficient to recreate the resource description framework dataset graph from the minimum set of common type based structures and the plurality of partitions. Therefore, in generating the ultimate summary used for keyword searching, the underlying original dataset graph information is not lost through summarization. In one embodiment, the plurality of auxiliary indexes includes a first index comprising an identification of portals in each partition, a second index mapping each partition to a covering tree associated with that partition and a third index mapping data nodes in each partition to summary nodes in the minimum set of common type based structures.

Exemplary embodiments in accordance with the present invention are also directed to methods for summarizing resource description framework datasets. These summaries are then used to respond to user defined keyword searches over the resource description framework datasets. In this method, the resource description framework dataset graph containing a plurality of entity vertices, type vertices and keyword vertices connected by a plurality of predicate edges is split into a plurality of partitions. Each partition contains a plurality of vertices and predicate edges connecting the vertices. In one embodiment, the resource description framework dataset graph is split into a plurality of predicate edge disjoint partitions. A union of all of these predicate edge disjoint partitions contains all vertices and predicate edges in the resource description framework dataset graph.

To reduce the number and size of the partitions, the partitions are generated from a condensed view of the dataset graph. Therefore, a condensed view of the resource description framework dataset graph is created by combining entity, keyword and type vertices into a plurality of condensed vertices linked only by inter entity vertex predicate edges from the resource description framework dataset. Entity information and keyword information are removed from each condensed vertex, and only type information is maintained in each condensed vertex, yielding a type based condensed graph and type based partitions. The condensed view of the resource description framework data graph is split into the plurality of partitions.

In one embodiment, splitting of the condensed view into the partitions includes creating a plurality of predicate edge disjoint subgraphs from the condensed view. Each subgraph begins at a given condensed vertex and extends out a predetermined number of hops through the condensed view of the resource description framework. Each partition represents a grouping of all subgraphs beginning at condensed vertices comprising common type information. Therefore, partitions are type specific. The creation of type specific partitions is further aided by grouping the plurality of condensed vertices by common type information. The condensed vertices on which to begin predicate edge disjoint graphs are selected by group, exhausting all condensed vertices in a given group before advancing to a subsequent group.

The method also includes defining a minimum set of common type based structures summarizing the plurality of partitions. This results in the summary that is used for keyword searching. In order to create this summary, a plurality of covering trees is created to represent the plurality of partitions by traversing each partition to create an associated covering tree comprising all distinct paths through the vertices of that partition. A core is extracted for each covering tree. This core represents a minimum number of vertices for the covering tree and is used to represent the structure of that covering tree. Homomorphisms among the plurality of covering trees are used to create the minimum set of common type based structures. This use or homomorphisms among the plurality of covering trees includes sequentially comparing each extracted core to existing structures in the minimum set of common type based structures, removing existing structures from the minimum set of common type based structures that represent a subset of a given extracted core being compared, terminating comparison of a given extracted core upon determination that the given extracted core represents a subset of existing structures in the minimum set of common type based structures and adding a given extracted core to the minimum set of common type based structures upon completing a comparison of that given extracted core to all existing structures in the minimum set of common type based structures and determining that the given extract core is not a subset of any existing structure.

A plurality of auxiliary indexes are maintained in the database in combination with the minimum set of common type based structures. These auxiliary indexes are used to recreate the resource description framework dataset graph from the minimum set of common type based structures and the plurality of partitions, for example, in response to a keyword search in order to obtain the underlying data from the original dataset graph. The plurality of auxiliary indexes includes a first index containing an identification of portals in each partition, a second index mapping each partition to a covering tree associated with that partition and a third index mapping data nodes in each partition to summary nodes in the minimum set of common type based structures.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for summarizing resource description framework datasets in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for summarizing resource description framework datasets, the method comprising:
creating a condensed view of the resource description framework dataset graph comprising a plurality of entity vertices, type vertices and keyword vertices connected by a plurality of predicate edges by combining entity, keyword and type vertices into a plurality of condensed vertices linked only by inter entity vertex predicate edges from the resource description framework dataset, the condensed view comprising a dataset graph;

removing entity information and keyword information from each condensed vertex and maintaining only type information in each condensed vertex;

grouping the plurality of condensed vertices by common type information;

splitting the condensed view of the resource description framework dataset graph into a plurality of partitions, each partition associated with a unique common type value selected from the type vertices and comprising a plurality of vertices and predicate edges connecting the vertices, splitting the condensed view of the resource description framework dataset graph comprising:

creating a plurality of predicate edge disjoint subgraphs by selecting condensed vertices on which to begin predicate edge disjoint graphs by group and exhausting all condensed vertices in a given group before advancing to a subsequent group, each subgraph beginning at a given condensed vertex and extending out a predetermined number of hops through the condensed view of the resource description framework, each partition comprising all subgraphs beginning at condensed vertices comprising common type information; and defining a minimum set of common type based structures summarizing the plurality of partitions.

2. The method of claim 1, wherein the step of splitting the resource description framework dataset graph into the plurality of partitions further comprises splitting the resource description framework dataset graph into a plurality of predicate edge disjoint partitions, a union of all predicate edge disjoint partitions comprising all vertices and predicate edges in the resource description framework dataset graph.

3. The method of claim 1, wherein defining the minimum set of common type based structures summarizing the plurality of partitions comprises creating a plurality of covering trees to represent the plurality of partitions by traversing each partition to create an associated covering tree comprising all distinct paths through the vertices of that partition.

4. The method of claim 3, wherein defining the minimum set of common type based structures summarizing the plurality of partitions further comprises:

extracting a core for each covering tree, the core comprising a minimum number of vertices for the covering tree; and using the extracted core to represent the structure of that covering tree.

5. The method of claim 4, wherein defining the minimum set of common type based structures summarizing the plurality of partitions further comprises using homomorphisms among the plurality of covering trees to create the minimum set of common type based structures.

6. The method of claim 5, wherein using homomorphisms among the plurality of covering trees comprises:

sequentially comparing each extracted core to existing structures in the minimum set of common type based structures;

removing existing structures from the minimum set of common type based structures that represent a subset of a given extracted core being compared;

terminating comparison of a given extracted core upon determination that the given extracted core represents a subset of existing structures in the minimum set of common type based structures; and adding a given extracted core to the minimum set of common type based structures upon completing a comparison of that given extracted core to all existing structures in the minimum set of common type based structures and determining that the given extract core is not a subset of any existing structure.

7. The method of claim 1, wherein the method further comprises:

maintaining a plurality of auxiliary indexes in combination with the minimum set of common type based structures; and using the plurality of auxiliary indexes to recreate the resource description framework dataset graph from the minimum set of common type based structures and the plurality of partitions.

8. The method of claim 7, wherein the plurality of auxiliary indexes comprises a first index comprising an identification of portals in each partition, a second index mapping each partition to a covering tree associated with that partition and a third index mapping data nodes in each partition to summary nodes in the minimum set of common type based structures.

9. A non-transitory computer-readable storage medium containing a computer-readable code that when read by a computer causes the computer to perform a method for summarizing resource description framework datasets, the method comprising:

splitting a resource description framework dataset graph comprising a plurality of entity vertices, type vertices and keyword vertices connected by a plurality of predicate edges into a plurality of partitions, each partition associated with a unique common type value selected from the type vertices and comprising a plurality of vertices and predicate edges connecting the vertices; and defining a minimum set of common type based structures summarizing the plurality of partitions, wherein defining the minimum set of common type based structures summarizing the plurality of partitions comprises:

creating a plurality of covering trees to represent the plurality of partitions by traversing each partition to create an associated covering tree comprising all distinct paths through the vertices of that partition;

extracting a core for each covering tree, the core comprising a minimum number of vertices for the covering tree;

using the extracted core to represent the structure of that covering tree; and using homomorphisms among the plurality of covering trees to create the minimum set of common type based structures, wherein using homomorphisms among the plurality of covering trees comprises:

sequentially comparing each extracted core to existing structures in the minimum set of common type based structures;

removing existing structures from the minimum set of common type based structures that represent a subset of a given extracted core being compared;

terminating comparison of a given extracted core upon determination that the given extracted core represents a subset of existing structures in the minimum set of common type based structures; and adding a given extracted core to the minimum set of common type based structures upon completing a comparison of that given extracted core to all existing structures in the minimum set of common type based structures and determining that the given extract core is not a subset of any existing structure.

10. The non-transitory computer-readable storage medium of claim 9, wherein the step of splitting the resource description framework dataset graph into the plurality of partitions further comprises splitting the resource description framework dataset graph into a plurality of predicate edge disjoint partitions, a union of all predicate edge disjoint partitions comprising all vertices and predicate edges in the resource description framework dataset graph.

11. The non-transitory computer-readable storage medium of claim 9, wherein the method further comprises:
   creating a condensed view of the resource description framework dataset graph by combining entity, keyword and type vertices into a plurality of condensed vertices linked only by inter entity vertex predicate edges from the resource description framework dataset, the condensed view comprising a dataset graph; and
   removing entity information and keyword information from each condensed vertex and maintaining only type information in each condensed vertex.

12. The non-transitory computer-readable storage medium of claim 11, wherein splitting the resource description framework dataset graph into the plurality of partitions further comprises splitting the condensed view of the resource description framework data graph into the plurality of partitions.

13. The non-transitory computer-readable storage medium of claim 12, wherein splitting the condensed view of the resource description framework dataset graph comprises creating a plurality of predicate edge disjoint subgraphs, each subgraph beginning at a given condensed vertex and extending out a predetermined number of hops through the condensed view of the resource description framework, each partition comprising all subgraphs beginning at condensed vertices comprising common type information.

14. The non-transitory computer-readable storage medium of claim 13, wherein:
   the method further comprises grouping the plurality of condensed vertices by common type information; and
   creating the plurality of predicate edge disjoint subgraphs further comprises selecting condensed vertices on which to begin predicate edge disjoint graphs by group, exhausting all condensed vertices in a given group before advancing to a subsequent group.

15. The non-transitory computer-readable storage medium of claim 9, wherein the method further comprises:
   maintaining a plurality of auxiliary indexes in combination with the minimum set of common type based structures; and
   using the plurality of auxiliary indexes to recreate the resource description framework dataset graph from the minimum set of common type based structures and the plurality of partitions.

16. The non-transitory computer-readable storage medium of claim 15, wherein the plurality of auxiliary indexes comprises a first index comprising an identification of portals in each partition, a second index mapping each partition to a covering tree associated with that partition and a third index mapping data nodes in each partition to summary nodes in the minimum set of common type based structures.

17. A method for summarizing resource description framework datasets, the method comprising:
   creating a condensed view of a resource description framework dataset graph comprising a plurality of entity vertices, type vertices and keyword vertices connected by a plurality of predicate edges by combining entity, keyword and type vertices into a plurality of condensed vertices linked only by inter entity vertex predicate edges from the resource description framework dataset;
   removing entity information and keyword information from each condensed vertex and maintaining only type information in each condensed vertex;
   grouping the plurality of condensed vertices by common type information;
   selecting condensed vertices sequentially by group;
   creating a plurality of predicate edge disjoint subgraphs, each subgraph beginning at a given condensed vertex within a given group and extending out a predetermined number of hops through the condensed view of the resource description framework;
   defining a plurality of partitions, each partition comprising all subgraphs beginning at condensed vertices comprising common type information;
   creating a plurality of covering trees to represent the plurality of partitions by traversing each partition to create an associated covering tree comprising all distinct paths through the vertices of that partition;
   extracting a core for each covering tree, the core comprising a minimum number of vertices for the covering tree;
   using homomorphisms among the plurality of covering trees to creating a minimum set of common type based structures summarizing the plurality of partitions; and
   maintaining a plurality of auxiliary indexes in combination with the minimum set of common type based structures, the plurality of auxiliary indexes suitable to recreate the resource description framework dataset graph from the minimum set of common type based structures and the plurality of partitions.

* * * * *